(12) United States Patent
Mair

(10) Patent No.: US 9,701,301 B2
(45) Date of Patent: Jul. 11, 2017

(54) METHOD FOR OPERATING A MOTOR VEHICLE WITH A DUAL CLUTCH TRANSMISSION AND CONTROL UNIT FOR CARRYING OUT THE METHOD

(71) Applicant: ZF Friedrichshafen AG, Friedrichshafen (DE)

(72) Inventor: Roland Mair, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 79 days.

(21) Appl. No.: 14/949,925

(22) Filed: Nov. 24, 2015

(65) Prior Publication Data

US 2016/0167664 A1 Jun. 16, 2016

(30) Foreign Application Priority Data

Dec. 10, 2014 (DE) ........................ 10 2014 225 474

(51) Int. Cl.
*B60W 10/02* (2006.01)
*B60W 10/113* (2012.01)
(Continued)

(52) U.S. Cl.
CPC .......... *B60W 10/113* (2013.01); *B60W 10/06* (2013.01); *B60W 30/18045* (2013.01);
(Continued)

(58) Field of Classification Search
CPC Y10T 477/641; Y10T 477/647; B60W 10/02; B60W 10/113; B60W 30/18045;
(Continued)

(56) References Cited

U.S. PATENT DOCUMENTS

| 7,252,621 B2 * | 8/2007 | Tanba .................. B60W 10/113 477/77 |
| 7,302,333 B2 | 11/2007 | Steen et al. |
| 9,598,081 B2 * | 3/2017 | Mair ............... B60W 30/18027 |

FOREIGN PATENT DOCUMENTS

| DE | 101 09 662 A1 | 9/2002 |
| DE | 101 28 853 A1 | 12/2002 |

(Continued)

OTHER PUBLICATIONS

English Translation of DE10128853A1, translationportal.epo.org, Apr. 5, 2017.*

(Continued)

*Primary Examiner* — Roger Pang
(74) *Attorney, Agent, or Firm* — Davis & Bujold, PLLC; Michael J. Bujold

(57) ABSTRACT

A method for operating a dual-clutch transmission of a vehicle having partial transmissions with respective transmission input shafts. Two friction clutches can couple a corresponding input shaft of the partial transmissions to a drive shaft. Both partial transmissions drive a common output shaft. During a rocking free operation for rocking the vehicle free, a gear in each respective partial transmission is engaged for driving in opposed primary and secondary directions as specified by the driver. The clutches are alternately engaged and disengaged. For rocking the vehicle free, the clutch of the partial transmission having the gear for driving in the primary direction when engaged, is engaged based on accelerator pedal actuation, and in contrast the clutch of the partial transmission having the gear for driving in the secondary direction when engaged, is automatically engaged if neither of the accelerator or brake pedals has been actuated.

8 Claims, 1 Drawing Sheet

(51) Int. Cl.
 B60W 10/06 (2006.01)
 B60W 30/18 (2012.01)
(52) U.S. Cl.
 CPC ......... *B60W 10/02* (2013.01); *B60W 2540/04* (2013.01); *B60W 2540/10* (2013.01); *B60W 2540/12* (2013.01); *B60W 2540/30* (2013.01); *B60W 2710/021* (2013.01); *B60W 2710/1005* (2013.01); *Y10T 477/641* (2015.01); *Y10T 477/647* (2015.01)
(58) Field of Classification Search
 CPC ......... B60W 2540/04; B60W 2540/10; B60W 2540/12; B60W 2710/1005; B60W 2710/021
 USPC .......................................................... 701/67
 See application file for complete search history.

(56) References Cited

FOREIGN PATENT DOCUMENTS

| DE | EP 1266788 A2 * | 12/2002 | ............ B60W 10/02 |
|---|---|---|---|
| DE | 60 2004 012 248 T2 | 3/2009 | |
| EP | 1 266 788 A2 | 12/2002 | |

OTHER PUBLICATIONS

English Translation of DE10109662A1, translationportal.epo.org, Apr. 5, 2017.*
English Translation of EP1266788A2, translationportal.epo.org, Apr. 5, 2017.*
German Search Report Corresponding to 10 2014 225 474.4 mailed Aug. 7, 2015.

* cited by examiner

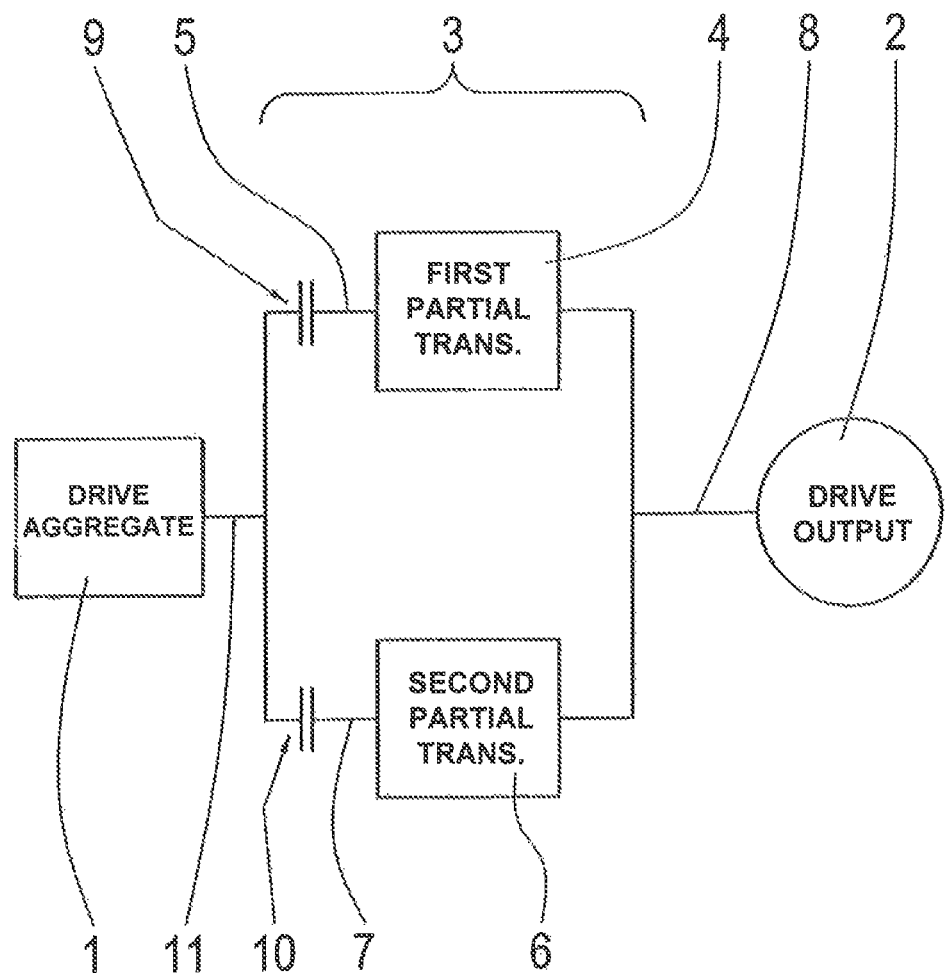

METHOD FOR OPERATING A MOTOR VEHICLE WITH A DUAL CLUTCH TRANSMISSION AND CONTROL UNIT FOR CARRYING OUT THE METHOD

This application claims priority from German patent application serial no. 10 2014 225 474.4 filed Dec. 10, 2014.

FIELD OF THE INVENTION

The invention concerns a method for operating a motor vehicle with a dual-clutch transmission. In addition the invention concerns a control unit for carrying out the method.

BACKGROUND OF THE INVENTION

From DE 101 09 662 B4 a method is known for operating a motor vehicle having a dual-clutch transmission, which serves to enable a quick succession of repeated travel direction changes, for example during a rocking free process. A dual-clutch transmission has two partial transmissions, each partial transmission having a separate transmission input shaft whereas both partial transmissions co-operate with a common transmission output shaft. A first powershiftable friction clutch is associated with a first partial transmission and a second powershiftable friction clutch is associated with a second partial transmission, in such manner that in its closed condition each powershiftable clutch couples the respective transmission input shaft of the partial transmission with which it is associated to a drive input shaft. To enable repeated direction changes between forward and reverse driving, in DE 101 09 662 B4 it is proposed to keep a forward gear permanently engaged in a first partial transmission and a reverse gear permanently engaged in a second partial transmission, and to produce the driving direction changes, to open and close the two powershiftable clutches in alternation. Such a direction changing mode is either initiated automatically or by the driver's action, while the direction changing mode is terminated depending on a brake pedal actuation and/or an accelerator pedal actuation and/or in a time-controlled manner and/or in a driving distance controlled manner.

From EP 1 266 788 B1 a further method for operating a motor vehicle is known. According to this prior art the alternate opening and closing of the powershiftable clutches during a rocking free process takes place when the driver actuates a suitable operating device, for example a key, an on-off switch or some other device. This enables the driver to actuate the powershiftable clutches selectively for the different travel directions during rocking free. However, this entails intervention by the driver, so that the rocking free process is dependent on the skill of the driver.

SUMMARY OF THE INVENTION

Starting from there, the purpose of the present invention is to provide a new type of method for operating a motor vehicle with a dual-clutch transmission.

This objective is achieved by a method as described below. To rock the motor vehicle free, the powershiftable clutch for that partial transmission in which the gear for the primary travel direction specified by the driver is engaged, is closed in a manner that depends on actuation of the accelerator pedal by the driver, whereas in contrast, the powershiftable clutch for the partial transmission in which the gear for the opposite, secondary travel direction is engaged, is automatically closed if the driver has not actuated the accelerator pedal or the brake pedal.

The method according to the invention is more highly automated and for rocking free only requires the driver to actuate the accelerator pedal.

Depending on actuation of the accelerator pedal by the driver, the powershiftable clutch associated with the partial transmission having the gear for the primary travel direction specified by the driver is closed or opened. If the driver has actuated neither the accelerator pedal nor the brake pedal, a transmission control unit takes over the automatic closing and opening of the other powershiftable clutch for the partial transmission in which the gear for the opposite, secondary travel direction is engaged. Compared with the prior art, this makes things easier for the driver during a rocking free process, so that rocking free does not depend on the skill of the driver.

Preferably, the powershiftable clutch for that partial transmission in which the gear for the opposite, secondary travel direction is engaged, is only closed automatically when, by virtue of the driver's actuation of the accelerator pedal, the powershiftable clutch for the partial transmission in which the gear for the primary travel direction specified by the driver has been closed at least once and in that way the driver has initiated the rocking free process in an active rocking free operating mode. This increases safety during a rocking free process. The driver is not caught unaware by an undesired closing of the powershiftable clutch for the secondary travel direction.

According to an advantageous further development, at least one closing parameter of the powershiftable clutch associated with that partial transmission in which the gear for the primary travel direction specified by the driver is engaged, is determined as a function of the driver's actuation of the accelerator pedal, while the powershiftable clutch for the partial transmission in which the gear for the opposite, secondary travel direction is engaged, is closed using the same closing parameters. This ensures that during a rocking free process, for example out of a hollow, the vehicle will leave the hollow in the primary travel direction.

Preferably, when the driver has not actuated the accelerator pedal but has actuated the brake pedal, the powershiftable clutch for that partial transmission in which the gear for the opposite, secondary travel direction is engaged, remains open. Alternatively, when the driver has not actuated the accelerator pedal but has instead actuated the brake pedal, the rocking free process terminates. The decision whether, when a brake pedal is actuated, only the powershiftable clutch for the partial transmission in which the gear for the opposite, secondary travel direction is engaged should remain open or whether, alternatively, the rocking free process should end, can be made by the control system depending on how firmly the brake pedal has been actuated.

The control unit for carrying out the method is also described below.

BRIEF DESCRIPTION OF THE DRAWING

Preferred further developments emerge from the description given below. Example embodiments of the invention, to which it is not limited, are explained in more detail with reference to the sole drawing, which shows a drive-train layout of a motor vehicle having a dual-clutch transmission.

DETAILED DESCRIPTION OF THE PREFERRED EMBODIMENTS

The present invention concerns a method for operating a motor vehicle with a dual-clutch transmission, and a control unit for carrying out the method.

The sole FIGURE shows a very schematically represented drive-train layout of a motor vehicle. The FIGURE shows a drive aggregate 1, a drive output 2 and a dual-clutch transmission 3 that is connected between the drive aggregate 1 and the drive output 2.

The dual-clutch transmission 3 has a first partial transmission 4 with a first transmission input shaft 5, and a second partial transmission 6 with a second transmission input shaft 7, wherein both partial transmissions 4, 6 co-operate with a common transmission output shaft 8. Associated with the first partial transmission 4 is a first powershiftable friction clutch 9 and associated with the second partial transmission 6 is a second powershiftable friction clutch 10, such that in its closed condition the respective powershiftable clutch 9 or 10 couples the corresponding transmission input shaft 5 or 7 of the partial transmission 4 or 6 concerned to a drive input shaft 11.

The present invention concerns such details for operating a motor vehicle with a dual-clutch transmission 3, which enable a particularly advantageous rocking free process of the motor vehicle.

Basically, the motor vehicle is only rocked free when a rocking free operating mode is active. A rocking free operating mode can be activated either directly, when the driver actuates an operating mode selector device such as a key or switch, or indirectly by virtue of driving behavior from which a control unit recognizes or deduces that the motor vehicle has become stuck and that a rocking free process should be carried out.

In an active rocking free operating mode, in one of the two partial transmissions 4 or 6 of the dual-clutch transmission 3 a gear for a primary travel direction specified by the driver is engaged, while at the same time in the other partial transmission 6 or 4 of the dual-clutch transmission 3 a gear for a secondary, opposite travel direction is engaged. The primary travel direction is designated by a position of a selector lever of the transmission, so that when a transmission selector lever position D for forward driving is engaged the primary travel direction is forward, whereas in contrast when a transmission selector lever position R for reversing is engaged, the primary travel direction is driving in reverse.

In order to rock the motor vehicle free, when in the two partial transmissions 4 and 6 the respective gears for opposite travel directions have been engaged, thereafter the powershiftable clutches 9, 10 of the partial transmissions 4, 6 are opened and closed in alternation.

For this purpose, the procedure is that the powershiftable clutch 9 or 10 for that partial transmission 4 or 6 in which the gear for the primary travel direction specified by the driver is engaged, is closed in a manner that depends on actuation of the accelerator pedal by the driver. Depending on the driver's actuation of the accelerator pedal, at least one closing parameter for the powershiftable clutch 9 or 10 is determined, on the basis of which a control unit acts to close the corresponding powershiftable clutch 9 or 10. The closing parameter can be the degree of closing and/or the closing rate of the powershiftable clutch 9 or 10.

The particular powershiftable clutch 10 or 9 for that partial transmission 6 or 4 in which the gear for the opposite, secondary travel direction is engaged, is automatically closed by the control unit, namely when neither the accelerator pedal nor the brake pedal has been actuated by the driver. In that case the powershiftable clutch 10 or 9 for that partial transmission 6 or 4 in which the gear for the opposite, secondary travel direction is engaged, is preferably closed using the same closing parameters as for the powershiftable clutch 9 or 10 for that partial transmission 4 or 6 in which the gear for the primary travel direction specified by the driver is engaged, these closing parameters being dependent on actuation of the accelerator pedal by the driver.

When the rocking free operating mode is active, the powershiftable clutch 10 or 9 for that partial transmission 6 or 4 in which the gear for the opposite, secondary travel direction is engaged, is only closed automatically for the first time if, by virtue of actuation of the accelerator pedal by the driver, the powershiftable clutch 9 or 10 for that partial transmission 4 or 6 in which the gear for the primary travel direction specified by the driver is engaged, has been closed at least once, and thereby the driver has initiated or allowed the rocking free process while the rocking free operating mode is active.

As already mentioned, when the driver has actuated the brake pedal the powershiftable clutch 10 or 9 associated with that partial transmission 6 or 4 in which the gear for the opposite, secondary travel direction is engaged, is not closed. Depending on the driver's actuation of the brake pedal, either this powershiftable clutch 10 or 9 for the partial transmission 6 or 4 in which the gear for the secondary travel direction is engaged can remain open, or alternatively, the rocking free process can even be terminated. If the driver only actuates the brake pedal for a relatively short time and/or relatively gently, then the rocking free process is preferably not terminated, but instead, the powershiftable clutch 10 or 9 for the partial transmission 6 or 4 in which the gear for the secondary travel direction is engaged, is kept open. In contrast, if actuation of the brake pedal is relatively prolonged and/or relatively firm, then the rocking free process is preferably terminated.

Accordingly, during the rocking free process it is only necessary for the driver to specify a primary travel direction for the rocking free process and to actuate the accelerator pedal to initiate the rocking free process. Other interventions by the driver are not necessary, so the rocking free process is automated and the driver is relieved of any further tasks or interventions during the rocking free. Accordingly, rocking free no longer depends on the skill of the driver.

The invention also concerns a control unit, in particular a transmission control unit, for carrying out the method. For that purpose the control unit comprises both hardware means and software means. As hardware means the control unit comprises data interfaces that enable it to exchange data with the assemblies involved in the method according to the invention, as well as a data memory for storing data and a processor for data processing. As software means the control unit contains program modules for carrying out the method according to the invention. The control unit is preferably a transmission control unit.

INDEXES

1 Drive aggregate
2 Drive output
3 Dual-clutch transmission
4 First partial transmission
5 First transmission input shaft
6 Second partial transmission
7 Second transmission input shaft
8 Transmission output shaft
9 First powershiftable clutch
10 Second powershiftable clutch
11 Drive input shaft

The invention claimed is:

1. A method of operating a motor vehicle having a dual-clutch transmission (3) that includes a first partial transmission (4) with a first transmission input shaft (5) and a second partial transmission (6) with a second transmission input shaft (7), and the dual-clutch transmission (3) comprises a first powershiftable friction clutch (9) associated with the first transmission input shaft (5) which, in an engaged condition thereof, couples the first transmission input shaft (5) and hence the first partial transmission (4) to a drive input shaft (11), and a second powershiftable friction clutch (10) associated with the second transmission input shaft (7) which, in an engaged condition thereof, couples the second transmission input shaft (7) and hence the second partial transmission (6) to the drive input shaft (11), and, the dual-clutch transmission (3) has an output shaft (8) that is common to both of the first and the second partial transmissions (4, 6), and, during a rocking free operating mode for rocking the motor vehicle free, in one of the first and the second partial transmissions a gear for a primary travel direction specified by a driver and, at a same time, in the other of the first and the second partial transmissions a gear for an opposite, secondary travel direction are engaged, and, the powershiftable clutches (9, 10) are alternately disengaged and engaged, the method comprising:

for rocking free of the motor vehicle, engaging the powershiftable clutch (9, 10) for that partial transmission (4, 6) in which the gear for the primary travel direction specified by the driver is engaged, in a manner that depends on actuation of an accelerator pedal by the driver, and, in contrast, if the driver neither actuates the accelerator pedal nor a brake pedal, automatically engaging the powershiftable clutch (10, 9) for the partial transmission (6, 4) in which the gear for the opposite, secondary travel direction is engaged.

2. The method according to claim 1, further comprising only automatically engaging the powershiftable clutch (10, 9) for the partial transmission (6, 4) in which the gear for the secondary travel direction is engaged when, by virtue of actuation of the accelerator pedal by the driver the powershiftable clutch (9, 10) for the partial transmission (4, 6) in which the gear for the primary travel direction specified by the driver is engaged, is engaged at least once, and, in that way, the driver initiates the rocking free process while the rocking free operating mode is active.

3. The method according to claim 1, further comprising activating the rocking free operating mode either directly, when the driver actuates an operating mode selector device, or indirectly by virtue of a driving behavior of the driver.

4. The method according to claim 1, further comprising determining at least one engaging parameter of the powershiftable clutch (9, 10) for the partial transmission (4, 6) in which the gear for the primary travel direction specified by the driver is engaged, depending on actuation of the accelerator pedal by the driver, and engaging the powershiftable clutch (10, 9) for the partial transmission (6, 4), in which the gear for the opposite, secondary travel direction is engaged, using the same engaging parameters.

5. The method according to claim 1, further comprising, when the driver has not actuated the accelerator pedal and actuates the brake pedal, maintaining disengagement of the powershiftable clutch (9, 10) for the partial transmission (6, 4) in which the gear for the opposite, secondary travel direction is engaged.

6. The method according to claim 1, further comprising terminating the rocking free process when the driver has not actuated the accelerator pedal and actuates the brake pedal.

7. A transmission control unit of a motor vehicle for carrying out a method of operating the motor vehicle which has a dual-clutch transmission (3) that includes a first partial transmission (4) with a first transmission input shaft (5) and a second partial transmission (6) with a second transmission input shaft (7), and the dual-clutch transmission (3) comprises a first powershiftable friction clutch (9) associated with the first transmission input shaft (5) which, in an engaged condition thereof, couples the first transmission input shaft (5) and hence the first partial transmission (4) to a drive input shaft (11), and a second powershiftable friction clutch (10) associated with the second transmission input shaft (7) which, in an engaged condition thereof, couples the second transmission input shaft (7) and hence the second partial transmission (6) to the drive input shaft (11), and, the dual-clutch transmission (3) has an output shaft (8) that is common to both of the first and the second partial transmissions (4, 6), and, in a rocking free operating mode for rocking the motor vehicle free, in one of the first and the second partial transmissions a gear for a primary travel direction specified by a driver and, at a same time, in the other of the first and the second partial transmissions a gear for an opposite, secondary travel direction is engaged, and, the powershiftable clutches (9, 10) are alternately disengaged and engaged, the method of operating the dual-clutch transmission comprising:

for rocking free of the motor vehicle, engaging the powershiftable clutch (9, 10) for the partial transmission (4, 6) in which the gear for the primary travel direction specified by the driver is engaged, in a manner that depends on actuation of an accelerator pedal actuation by the driver, and in contrast, if the driver neither actuates the accelerator pedal nor a brake pedal, automatically engaging the powershiftable clutch (10, 9) for the partial transmission (6, 4) in which the gear for the opposite, secondary travel direction is engaged.

8. A method of operating a motor vehicle having a dual-clutch transmission that includes a first partial transmission having a first transmission input shaft, a first powershiftable friction clutch that, when engage, connects the first transmission input shaft to a drive input shaft, and a second partial transmission having a second transmission input shaft, a second powershiftable friction clutch that, when engaged, connects the second transmission input shaft to the drive input shaft, the first and the second partial transmissions are both connected to a common output shaft which drives a drive output of the motor vehicle, the dual-clutch transmission is controlled by a transmission control unit which communicates with a drive selector lever, an operating mode selector device, an accelerator pedal and a brake pedal, and the first partial transmission has a primary gear that is engagable for driving the vehicle in a primary direction of travel, and the second partial transmission has a secondary gear that is engagable for driving the vehicle in a secondary direction of travel, opposite to the primary direction of travel, the method comprising:

activating a rocking free operating mode by recognizing, via the transmission control unit, either actuation of the operating mode selector device or a defined driving behavior;

determining the primary and the secondary directions of travel based on a position of the selector lever;

engaging the primary gear in the first partial transmission and the secondary gear in the second partial transmission; and while the rocking free operating mode is active, alternately engaging the first powershiftable friction clutch based on activation of the accelerator pedal for driving the vehicle in the primary direction and disengaging the second powershiftable friction clutch; and disengaging the first powershiftable friction clutch and automatically engaging the second powershiftable friction clutch, when the accelerator pedal and the brake pedal are deactivated.

* * * * *